Patented Aug. 24, 1943

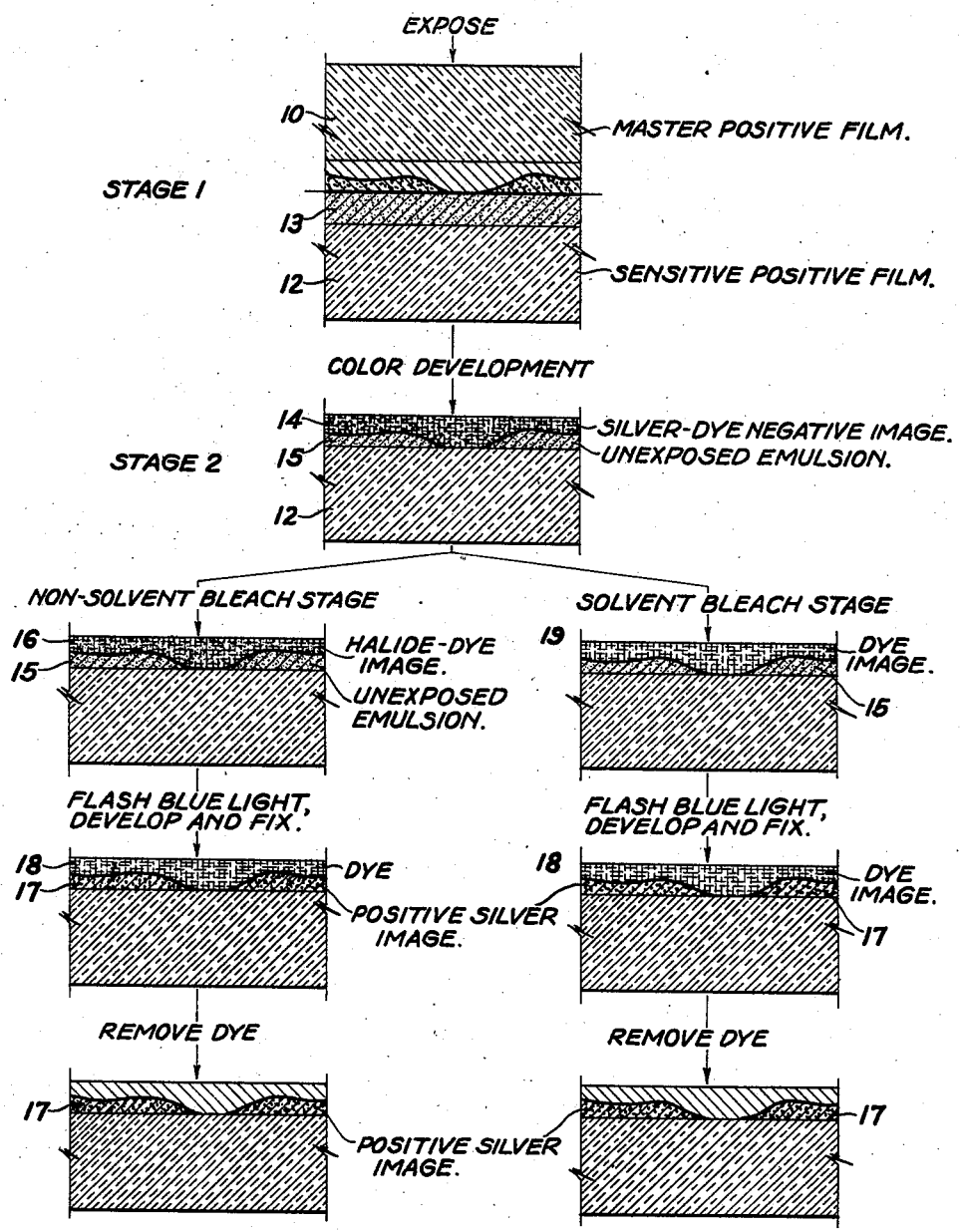

2,327,822

UNITED STATES PATENT OFFICE 2,327,822

REVERSAL DUPLICATING PROCESS

Harold D. Russell and Howard A. Miller, Rochester, N. Y., assignors to Eastman Kodak Company, Rochester, N. Y., a corporation of New Jersey Application August 6, 1941, Serial No. 405,660

3 Claims. (Cl. 95—6)

This invention relates to a process for the duplication of photographic films and more particularly to a process whereby duplicates are obtained by a reversal method.

In the past it has been the practice to reproduce motion picture films by means of duplicate negatives. The negative image was produced by printing through a master positive film onto suitable negative stock. From the master negative thus obtained, duplicate positives were then printed. More recently, duplicate positives have been produced employing the reversal process. The procedure has been to make a first exposure into a positive emulsion layer and after development and removal of the negative image, the remaining unexposed silver halide was flashed and developed to form a positive image in silver.

There are many disadvantages of the reversal method in duplicating processes. One of these is the fact that the contrast of the resulting duplicate positive is determined largely by the first exposure and negative development. If the first exposure and negative development tend to produce high or low contrast, then the second exposure and development tends to give correspondingly high or low contrast.

There are methods known for use in the control of contrast, which employ colored emulsion layers for receiving an image. The coloring matter in these layers tends to control contrast in printing, especially, if a printing light is of a color contrasty to the color of the emulsion which is used. Other methods for the control of contrast in color processes, employ a metallic masking image which places density over certain regions of an original transparency.

The objects of the present invention are, in general, to provide a method for the control of contrast in the production of duplicates of photographic films by reversal.

Another object is to provide a method for the control of contrast in duplicating black-and-white films by reversal.

Another object is to provide a method for the control of contrast in duplicating color films by reversal.

The objects of the present invention are accomplished by printing an image of an original in a light sensitive layer and developing a colored image in the region of the latent image; thereafter, printing through the colored image into the unexposed area of the layer to form an opposite image of the desired contrast.

The accompanying drawing is a flow sheet providing sectional views of a film at various stages in processing.

In the first stage in the drawing is illustrated exposing a sensitive positive film through a master positive film.

The appearance of the exposed and color developed film is shown in the second stage.

In the non-solvent bleach stage illustrated, the first step is bleaching in a solution not dissolving the rehalogenized silver; the second is flashing with blue light, developing and fixing; and the third consists in removing the dye image.

In the solvent bleach stage illustrated, the first step is bleaching in a bleach solution which dissolves the rehalogenized silver; the second is flashing with blue light, developing and fixing; and the third consists in removal of the dye image.

Our invention will now be explained by particular reference to the accompanying drawing.

As shown in the first stage, a positive film 12 of the type commonly used in duplicating processes, carrying an emulsion layer 13, is exposed through an original film 10, (either a negative or a positive in which case the final duplicate film will be either a negative or positive). After exposure, in the case illustrated, the film 12 containing a latent negative image is subjected to a color-forming development in which the oxidation product of the developing compound couples with a color-forming compound to produce a silver and dye image 14 in the region of the latent image as shown in the second stage. The following formula is typical of yellow coupler developer solutions which react with exposed silver halide to form silver and yellow dye images.

| | | |
|---|---|---|
| p-Aminodiethylaniline | grams | 2.0 |
| Sodium sulfite (des.) | do | 10.0 |
| Sodium carbonate (des.) | do | 30.0 |
| 2,5-dichloro-acetoacetanilide | do | 2.0 |
| Potassium bromide | do | 0.5 |
| Water to | liter | 1.0 |

After the developed film is washed, it is bleached in either a "solvent" or a "non-solvent" alkaline bleach bath of the following compositions:

Solvent bleach

| | | |
|---|---|---|
| Cupric chloride | grams | 25.0 |
| Ammonium persulfate | do | 25.0 |
| Sodium chloride | do | 50.0 |
| Ammonium hydroxide (28%) | cc | 50.0 |
| Water to | liter | 1.0 |

Non-solvent bleach

| | | |
|---|---|---|
| Cupric chloride | grams | 25.0 |
| Ammonium persulfate | do | 60.0 |
| Ammonium hydroxide (28%) | cc | 50.0 |
| Potassium bromide | grams | 5.0 |
| Water to | liter | 1.0 |

By "solvent" and "non-solvent" bleach bath, as used herein, we mean bleaching solutions which either dissolve or do not dissolve rehalogenated silver in the presence of another silver halide. The above bleach solutions are suitable if the positive film 12 carries a bromide or iodide emulsion, however, if film 12 carries a chloride emulsion only the non-solvent bleach would be used.

Where the film is bleached with the non-solvent bleaching solution the negative silver image is bleached to silver bromide and the film will have the appearance shown in the first step of the non-solvent bleach stage. In the positive area of the emulsion layer there will be unexposed halide 15, and in the negative area, a rehalogenized silver and dye image 16. The rehalogenized silver in the negative area is relatively insensitive to light as compared to the sensitivity of the unexposed halide. Therefore, when an exposure is made, in the manner of our invention, with blue light through the negative halide and dye image 16, an image of controlled contrast is produced in the hitherto unexposed emulsion area 15. After developing, fixing, and washing the film, the emulsion layer contains a positive image 17 and a negative dye image 18 and appears as shown in the second step of this stage. The dye image 18 is then removed by treatment with an acid sulfite solution of the following composition:

Sodium bisulfite_____grams__ 25.0
Hydrochloric acid (conc.)_____cc__ 25.0
Water to _____liter__ 1.0

The film then appears as shown in third step of this stage, and contains only the positive silver image 17 in the emulsion layer. The dye may be removed with the above solution any time subsequent to the second exposure.

In an alternate manner, when we use the solvent bleach solution for treating the element shown in the second stage of the drawing, the negative silver in the negative silver and dye image 14 is bleached to silver chloride and simultaneously removed from the emulsion layer, leaving the dye image 19 and unexposed emulsion 15 as shown in the first step of this stage. Thereafter the film is flashed with blue light, developed, fixed, washed and the dye image removed with the acid sulfite solution as described above. During these processing steps the film appears as shown in the second and third steps of this stage. The dye image may be removed in the last step of processing or at a time subsequent to the second exposure. The photographic characteristics of the resultant image 17, does not differ essentially from image 17 formed in the non-solvent bleach stage, although, due to the presence of the halide negative image in area 16 of the first step of the non-solvent bleach stage, a somewhat greater exposure may be required to produce an image of the same character in this stage, as would result from exposing through area 19 of the element illustrated in the first step of the solvent bleach stage, which contains no halide in the negative area.

In a similar manner we may control contrast by varying the color of the negative silver and dye image 14. For instance, when we use a coupling agent such as 1-p-nitrophenyl-3-methyl-5-pyrazolone, instead of a yellow coupler, in a color-forming developer, a red negative image is formed and contrast control is obtained by printing through this image with blue light into the unexposed silver halide emulsion. Likewise, when a green coupler is used a green negative is formed which may be used in our method for contrast control.

Our invention is subject to other variations. We may render the bleach baths alkaline with reagents other than ammonia, such as, aliphatic amines and diamines e. g. ethylene diamine, in which case a bleach solution of somewhat better stability is obtained.

In applying our invention to subtractive color processes in which images are formed by coupler development, we may form the negative (or positive if the original is a negative) dye image in a separate layer on a multilayer color film, or in the same layer in which a subtractively colored image is to be formed, and use this colored image for controlling contrast during reversal exposure. In the latter case we make use of the negative silver from first development in the color process, to form a colored negative image through which a reversal exposure is made.

It may be necessary, when the color-developed negative image is used in controlling contrast in color processes, to insert a filter between the emulsion layer and underlying layers sensitive to the printing light, to prevent exposure of the layers.

Another variation of our invention when applied to contrast control in black-and-white photography, is to color develop the exposed element 12 of the first stage of the drawing, to a red or blue color by means of a suitable coupler development process, and to then sensitize the unexposed emulsion to green or red, respectively. In case the unexposed emulsion area of a film is sensitized as above described, a bleach solution which will not destroy the sensitivity, such as, a ferricyanide and bromide bleach solution may be used. The subsequent flash exposure of the elements, sensitized as described, corresponding to those shown in the first step of the bleach stages, is then made with contrasty lights such as green and red light, respectively.

In general, the color of the negative image will be complementary to, or at least partially absorbent of the light to which the unexposed emulsion is sensitive.

It is to be understood that the disclosure herein is by way of example and that we consider as included in our invention all modifications and equivalents falling within the scope of the appended claims.

What we claim is:

1. A method for obtaining contrast control in photographic reversal printing processes which comprises exposing a colorless light-sensitive silver bromide emulsion layer through an original transparency, developing a yellow dye image in the region of the latent image, bleaching the developed silver image to silver halide, exposing the originally unexposed silver halide through the dye image with light absorbed by the dye image, developing and fixing the film, then removing the dye image.

2. A method for obtaining contrast control in photographic reversal printing processes which comprises exposing a colorless light-sensitive silver bromide emulsion layer through an original transparency, developing a yellow dye image in the region of the latent image, bleaching the developed silver image to silver halide, with a solution not dissolving the silver halide, exposing the originally unexposed silver halide through the dye image with light absorbed by the dye image, developing and fixing the film, then removing the dye image.

3. A method for obtaining contrast control in photographic reversal printing processes which comprises exposing a colorless light-sensitive silver bromide emulsion layer through an original transparency, developing a yellow dye image in the region of the latent image, bleaching the developed silver image to silver halide with a solution dissolving the silver halide, exposing the originally unexposed silver halide through the dye image with blue light, developing and fixing the film, then removing the dye image.

HAROLD D. RUSSELL.
HOWARD A. MILLER.